May 26, 1964     C. G. EICHENBERGER ETAL     3,134,918
SIGNAL GENERATOR WITH LOST MOTION DRIVE
Filed March 14, 1961

INVENTORS
CARL G. EICHENBERGER,
SAMUEL STACK,

BY Dodge and Sons
ATTORNEYS

3,134,918
SIGNAL GENERATOR WITH LOST MOTION DRIVE
Carl G. Eichenberger and Samuel Stack, Troy, N.Y., assignors to W. & L. E. Gurley, Troy, N.Y., a corporation of New York
Filed Mar. 14, 1961, Ser. No. 95,632
6 Claims. (Cl. 310—168)

This invention relates to an improved apparatus for measuring and indicating the rotational speed of a driven shaft.

It is known in the prior art to provide shaft speed-indicating devices of the type having stationary signal-generating means cooperating with an element secured to the shaft for producing visible, audible, or electric signals which are indicative of shaft speed. In one known electrical embodiment, a ferromagnetic rotor element provided with a circumferential series of uniformly-spaced teeth is rigidly secured to the shaft for rotation relatively to a stationary magnetic pick-up head. The pick-up head includes a ferromagnetic core upon which is wound an electrical coil. The flux changes which are produced in the core by the passage of the rotor teeth generate in the coil electrical pulses having a frequency dependent both upon the number of teeth and the speed of rotation of the shaft.

A major drawback of the known shaft speed measuring devices resides in the fact that for very low shaft speeds the generated signals are not sharply defined, and consequently, detection of the signals and accurate measuring of the shaft speed are rendered most difficult. In the ferromagnetic rotor embodiment, for example, at low shaft speeds the rate of flux change in the iron core is relatively low, and since the voltage generated in the coil is directly proportional to the rate of flux change, the amplitudes of the signals are very small.

The object of the present invention is to provide an improved apparatus for measuring the relative speed of movement between two elements arranged for travel past each other, one of said elements carrying energizing means and the other of said elements carrying signal-generating means operable by said energizing means to produce a signal having a property which varies as a function of the rate of movement between the means. According to the invention, at least one of the two means mentioned above is connected with its supporting element by a lost-motion coupling, and magnetic means are provided which operate, when the two supporting elements are moving toward each other at a low rate of speed, to cause at least one of the two means to accelerate momentarily to produce an instantaneous relative speed between the two means which exceeds the relative speed of movement between the two elements. As a result of this momentary acceleration of the rotor and the resulting increased rate of reaction between the energizing means and the signal-generating means, a sharper and more pronounced signal is obtained. In its broadest sense, the invention relates to devices for measuring the relative speeds of elements having linear or curvilinear motion.

The preferred embodiment of the invention relates to a device of the electrical type for measuring the speed of rotation of a rotating shaft. This embodiment includes a rotor loosely coupled with the shaft for normal simultaneous movement therewith, said rotor being formed of a non-magnetic material and carrying, adjacent its outer periphery, at least one ferromagnetic bar. Stationary magnetic pick-up head means are arranged adjacent the rotor and include a permanently magnetized core upon which is wound the electrical pulse-generating coil. Each time the ferromagnetic rotor member passes the pick-up means, the flux in the core varies to generate a pulse in the coil which is detected by conventional electrical indicating means connected thereto. The permanent magnet of the pick-up head is specifically designed to apply to the ferromagnetic member a force of magnetic attraction which causes the rotor to be momentarly accelerated to an instantaneous speed which is graeter than the rotational speed of the shaft as the ferromagnetic member approaches the pick-up means. In this manner, the rate of flux change is increased to generate pulses of magnified amplitude and sharpness.

Other objects and advantages of the invention will become more apparent from a study of the following specification when considered in conjunction with the accompanying drawing, in which.

Figure 2:
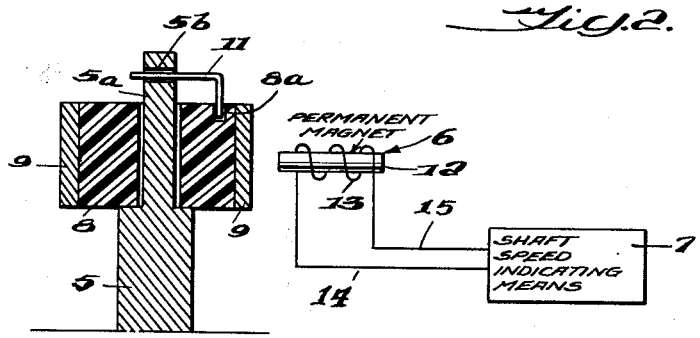
FIG. 2 is a sectional view taken along line 2—2 of FIG. 1.
Figure 1:
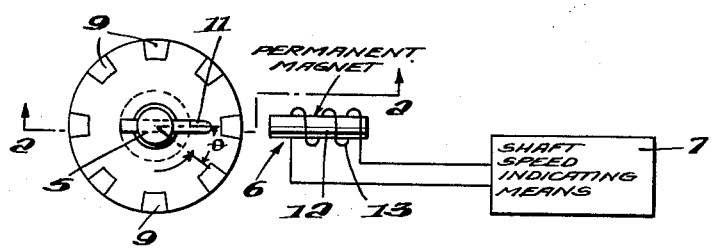
FIG. 1 is a plan view of the shaft speed measuring apparatus.

Referring to FIGS. 1 and 2, a driven shaft 5 is journalled in bearing means (not shown) for rotation relatively to the stationary magnetic pick-up head 6 of the shaft speed indicating device 7. The shaft 5 has an end portion 5a of reduced diameter upon which is loosely mounted an annular rotor 8 formed of a non-magnetic material, such as one of the light-weight synthetic plastics (polyethylene, for example). The diameter of the bore of rotor 8 is slightly greater than that of shaft portion 5a so that the rotor turns freely on the shaft. Embedded in the outer periphery of the rotor parallel with the axis of shaft 5 are a plurality of uniformly-spaced ferromagnetic bars 9. The rotor 8 is loosely coupled with the shaft 5 by means of the metal rod 11. Rod 11, at one end, extends through the transverse opening 5b in the shaft portion 5a and, at the other end, is bent at a right angle to form an arm portion which extends into the recess 8a in the adjacent end face of rotor 8. Opening 5b and are slightly oversize to permit a small degree of play between the elements.

The stationary magnetic pick-up head 6 is arranged adjacent the outer periphery of the rotor and includes a permanent magnet core 12 (formed of Alnico 5, for example) upon which is wound an insulated electrical coil 13. Coil 13 is connected with the detecting and indicating means 7 view conductors 14 and 15. The detecting and indicating means 7 are conventional and serve to produce a voltage the magnitude of which is proportional to the number of pulses generated in coil 13 per unit time. The value of this voltage is a direct function of the rotational speed of the shaft and is indicated by conventional read-out means.

In operation, the driven shaft 5 is connected, either directly or through suitable transmission means, with a rotating driving element (for example, the fluid-driven shaft of an anemometer). Assuming that the shaft 5 is in an initial state of rest and that a counterclockwise driving torque is applied thereto (as indicated by the arrow in FIG. 1), then as the shaft turns through a small angle θ in the counterclockwise direction, the rotor 8, owing to its inertia and to the forces of magnetic attraction described below, is maintained momentarily in its initial state of repose and the rod 11 pivots, in the oversized bores 5b and 8a, toward an end position of its lost-motion degree of travel. When the rod 11 reaches this end position, the driving force of the shaft is transmitted directly to the rotor, and further rotation of the shaft effects simultaneous rotation of the rotor through the rod. The rotor now lags behind the shaft by the angle θ.

Figure 3:
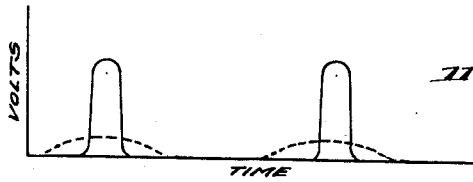
FIG. 3 illustrates the improved pulse waveform produced as a result of the present invention.

Assuming that the shaft 5 is driven at a very low rate of speed, that the mass of rotor 8 is relatively low, and that the magnetic force of attraction between the permanent magnet 12 and each of the rotor bars 9 is very high, then as the shaft 5 rotates to a position in which a given bar 9 just enters the field of the stationary magnet 12 the bar is magnetically attracted toward the magnet with such a force that the rotor 8 is caused to accelerate on the shaft 5 (as permitted by the loose coupling) and to obtain an instantaneous speed which is greater than the speed of rotation of the shaft. The lag angle $\theta$ decreases to zero and bar 9, which is now traveling at a relatively high rate of speed, effects a rapid change of flux in magnet 12 to generate a sharply-defined pulse of large amplitude in coil 13. The improved operation resulting from the use of the lost-motion coupling in combination with the force of magnetic attraction may be illustrated with reference to FIG. 3 wherein the dashed line shows the low-peak pulse waveform which would be obtained for a given speed of rotation when the rotor is rigidly secured to the shaft and the magnetic attracting means are omitted, and the solid line illustrates the improved high-peak pulse waveform obtained as a result of the present invention.

The momentum imparted to the rotor 8 by the force of magnetic attraction may cause the rotor to lead the shaft momentarily as a given bar passes the pick-up head. However, as the shaft 5 continues to turn in the counterclockwise direction, the force of magnetic attraction between the given bar 9 and the magnet 12 causes the rotor to lag again behind the shaft by the lag angle $\theta$. The momentary acceleration of the rotor described above is repeated each time a rotor bar 9 is moved within the field of the permanent magnet 12.

For relatively high rotational speeds of the shaft 5 producing peripheral rotor speeds equal to or greater than the speed at which a given rotor bar is attracted to the permanent magnet, the force of magnetic attraction has no effect on the rotor, and consequently, the rotor continuously lags behind the shaft by the constant lag angle $\theta$. A flux change is effected in magnet 12 each time a bar 9 passes thereby, and since the bars are travelling at a high rate of speed, the generated pulses have large amplitudes and are readily detected, integrated and indicated by the indicating device 7.

Figure 4:
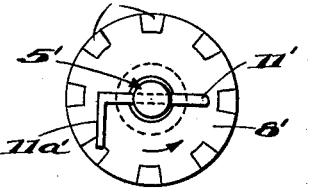
FIG. 4 is a plan view of the shaft speed measuring device using another coupling rod embodiment.

Referring to FIG. 4, the coupling rod 11' may be provided with a second arm portion 11a' which is horizontal and normal to the plane containing the body portion of the rod and the arm portion which extends downward into the oversize recess in the upper surface of the rotor. The weight of this second arm portion 11a' assists in initiating the snap movement of the rotor as a bar 9' just enters the magnetic field of the magnet during low speed rotation of the shaft.

Although the loose coupling has been illustrated and described as being a rod supported loosely in oversized bores, the use of a resilient spring, flexible coupling, or other lost-motion coupling device is not excluded.

While the presently preferred embodiment of the invention has been illustrated and described in the accompanying specification and drawing, it is apparent that other changes may be made in the apparatus described without deviating from the invention set forth in the following claims.

What is claimed is:

1. A speed indicating device comprising a pair of relatively movable elements arranged for movement past each other along a path of motion; energizing means associated with one of said elements; signal-generating means associated with the other of said elements and operable by the energizing means to produce a signal having a property which varies as a function of the rate of relative movement between the means; a lost-motion connection between at least one of said means and its associated element and arranged to permit relative movement therebetween only along said path of motion; a ferromagnetic member secured to one of said means; and a magnet secured to the other of said means for applying a force of magnetic attraction to said ferromagnetic member.

2. A speed indicating device comprising a rotary shaft adapted to be driven at variable speeds; an annular rotor mounted on said shaft and normally rotating with said shaft in a substantially fixed plane, said rotor being formed of a non-magnetic material; at least one ferromagnetic member secured to the rotor adjacent its outer periphery; lost-motion coupling means connectnig said rotor with said shaft and permitting relative angular movement therebetween in said plane at low shaft speeds; signal-generating means cooperating with said rotor to produce a signal having a property which is a function of the relative rate of movement between said signal-generating means and said rotor; and magnet means cooperating with the ferromagnetic member for momentarily accelerating said rotor to an instantaneous speed which is greater than the speed of rotation of said shaft when said ferromagnetic member approaches said signal-generating means.

3. Apparatus as defined in claim 2 wherein said shaft contains a bore extending transversely therethrough and said rotor contains a recess in one end surface thereof; and further wherein said coupling means comprises a rod having a linear body portion mounted in said bore and extending normal to the shaft, a first arm portion at one end of and normal to said body portion, said first arm portion extending into said rotor recess, and a second arm portion at the other end of said body portion, said second arm portion being normal to the plane containing said body portion and said first arm portion, the cross-sectional dimensions of said bore and said recess being greater than the corresponding cross-sectional dimensions of the body and first arm portions, respectively, of said rod.

4. Apparatus as defined in claim 2, wherein said signal-generating means includes a magnetic pick-up head comprising a permanent magnet core and an electrical coil associated with said core for generating an electrical signal when the flux in said core is varied by the passage of the ferromagnetic member; and further wherein said permanent magnet core constitutes said magnet means.

5. A speed indicating device comprising a pair of relatively movable elements arranged for movement past each other along a path of motion at a variable relative speed; energizing means associated with one of said elements; signal generating means associated with the other of said elements and operable by the energizing means to produce a signal having a property which is a function of the rate of relative movement between the means; a lost-motion connection between at least one of said means and its associated element, said connection permitting relative movement therebetween along said path of motion only when said relative speed is low; a ferromagnetic member secured to said one means; and a magnet secured to the other of said means for applying a force of magnetic attraction to said ferromagnetic member.

6. Apparatus as defined in claim 5 wherein when said relative speed is low, the lost motion connection permits the magnet in cooperation with the ferromagnetic member to momentarily accelerate said one means relative to the other means.

References Cited in the file of this patent

UNITED STATES PATENTS

| 2,453,523 | McCullough | Nov. 9, 1948 |
| 2,454,367 | Artzt | Nov. 23, 1948 |
| 2,900,589 | Putnocky | Aug. 18, 1959 |